JOHN H. THOMAS.
Improvement in Feed-Rollers for Grain-Drills.
No. 114,227.                                Patented April 25, 1871.
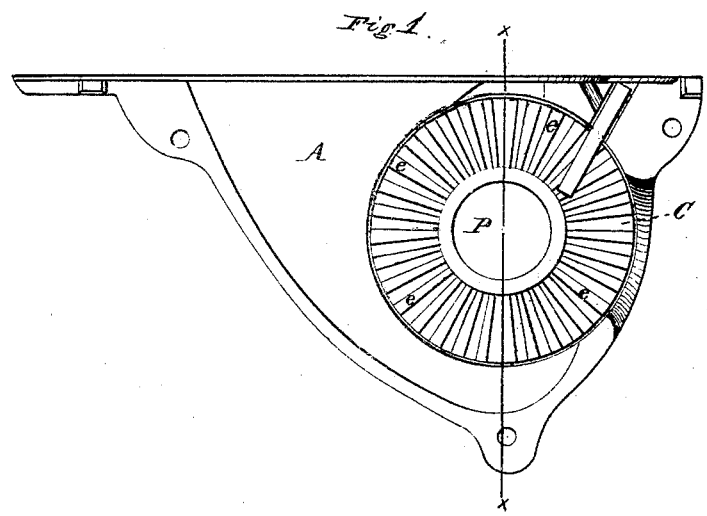
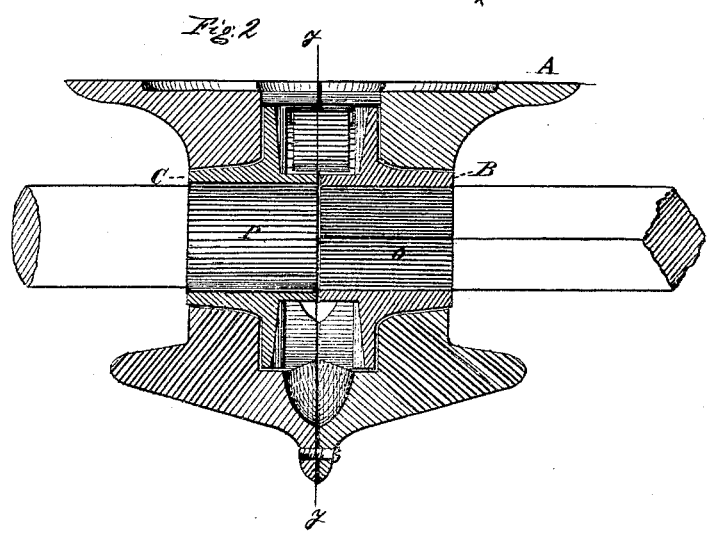
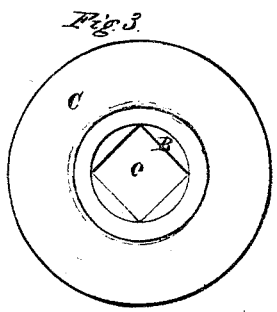

UNITED STATES PATENT OFFICE.

JOHN H. THOMAS, OF SPRINGFIELD, OHIO.

IMPROVEMENT IN FEED-ROLLERS FOR GRAIN-DRILLS.

Specification forming part of Letters Patent No. 114,227, dated April 25, 1871.

*To all whom it may concern:*

Be it known that I, JOHN H. THOMAS, of Springfield, in the county of Clarke and State of Ohio, have invented certain Improvements in Feed-Rolls for Grain-Drills, of which the following is a specification, reference being had to the accompanying drawings.

My invention relates to the feed-wheels of grain-drills; and the invention consists in constructing the wheel or roller in two parts, one having a square hole through it for the insertion of the shaft to turn it, and the other half having a round hole or one of larger diameter, so that the shaft may turn freely therein, while that portion of the wheel or roller itself remains stationary, as hereinafter more fully explained.

Figure 1 is a side elevation of one-half of the seed-cup with the stationary roller seated therein, the view being taken from the inside. Fig. 2 is a transverse vertical section taken on the line $xx$ of Fig. 1. Fig. 3 is an end view of the rollers detached from the cup.

This invention is an improvement upon the roll described in the application filed by me on the 5th day of December, 1870, and which need not, therefore, be specially described, except as to the improvement which forms the subject of the present application.

In the drawings, A represents the seed-cup, in which the feed wheel or roller is mounted. In all former cases the feed wheel or roller, whether made in one or two parts, has revolved as a whole; but in the present instance I construct it so that one half only will rotate while the other half may remain stationary. This I do by making the hole through the part that is to remain stationary of such a size that the shaft which turns or carries the other half of the wheel may turn loosely therein, thus letting the half having this enlarged hole remain stationary.

In the drawings, B represents one half of the feed-wheel, and C the other half, they being separated on the line $zz$ of Fig. 2. The part B, I form with a square hole, O, through its center, as shown in Figs. 1 and 2, of a size corresponding to the shaft which is to pass through it and give motion to it. The part C is made with a round hole, P, through it, as represented in Figs. 1 and 2. It will therefore be apparent that if the two parts B and C of the roll be placed in a seed-cup, A, as shown in Fig. 2, and a square shaft be passed through them, as there indicated, the part B will turn with the shaft, while the part C may remain stationary, the shaft turning loosely therein.

It is obvious that instead of making the hole O in the part B square it may also be made round, and part B be wedged fast to the shaft, or be secured by set-screws or a pin, or in any other manner, to the shaft, and the result be the same; or the holes in both parts may be made either square or round and of uniform diameter, the shaft being turned down or made of smaller diameter where it passes through one part, so as to be loose therein, and accomplish the same result.

The inner faces of the radial flanges of the roll are represented as provided with radial ribs or projections $e$ for feeding out the grain; but it is obvious that these ribs $e$ may be made of any desired form, and that the inner faces of the flanges may be curved or straight on their faces, as described in my previous application. The intention is to make these rolls of the same size as those referred to in my previous application, so that either kind may be used at will in the same seed-cups and on the same machine.

Having thus described my invention, what I claim is—

A feed roll or wheel for grain-drills, made in two parts, one of which is arranged to remain stationary while the other part rotates, substantially as described.

JOHN H. THOMAS.

Witnesses:
 H. S. SHOWERS,
 JNO. M. SPECK.